(12) United States Patent
Lim et al.

(10) Patent No.: US 12,008,988 B2
(45) Date of Patent: Jun. 11, 2024

(54) ELECTRONIC APPARATUS AND CONTROLLING METHOD THEREOF

(71) Applicant: Samsung Electronics Co., Ltd., Suwon-si (KR)

(72) Inventors: Hyeontaek Lim, Suwon-si (KR); Sejin Kwak, Suwon-si (KR); Youngjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 17/065,027

(22) Filed: Oct. 7, 2020

(65) Prior Publication Data

US 2021/0110824 A1 Apr. 15, 2021

(30) Foreign Application Priority Data

Oct. 10, 2019 (KR) .......................... 10-2019-0125169

(51) Int. Cl.
*G10L 15/22* (2006.01)
*G10L 15/18* (2013.01)
*G10L 15/24* (2013.01)

(52) U.S. Cl.
CPC .............. *G10L 15/22* (2013.01); *G10L 15/18* (2013.01); *G10L 15/24* (2013.01)

(58) Field of Classification Search
CPC ......... G10L 15/22; G10L 15/18; G10L 15/24; G10L 15/02; G10L 15/25; G10L 17/24;
(Continued)

(56) References Cited

U.S. PATENT DOCUMENTS 5,799,065 A * 8/1998 Junqua .................. H04M 3/527
704/E15.047
5,924,070 A * 7/1999 Ittycheriah ........ H04M 3/42204
704/275
(Continued)

FOREIGN PATENT DOCUMENTS

EP 3 279 790 A1 2/2018
JP 2011-215421 A 10/2011
(Continued)

OTHER PUBLICATIONS

European Search Report dated Jul. 19, 2022; European Appln. No. 20874423.5-1224 / 3994687 PCT/KR2020013718.
(Continued)

*Primary Examiner* — Thuykhanh Le
(74) *Attorney, Agent, or Firm* — Jefferson IP Law, LLP

(57) ABSTRACT

An electronic apparatus and a controlling method thereof are provided. The electronic apparatus includes a microphone, a camera, a memory configured to store at least one command, and at least one processor configured to, based on a first user voice being input from a user, provide a response to the first user voice, based on an audio signal including a voice being input while the response to the first user voice is provided, analyze an image captured by the camera and determine whether there is a second user voice uttered by the user in the audio signal, and based on determining that there is the second user voice uttered by the user in the audio signal, stop providing the response to the first user voice and obtain and provide a response to the second user voice.

16 Claims, 9 Drawing Sheets

(58) Field of Classification Search
CPC ... G10L 2015/225; G06F 3/167; G06F 40/35; G06T 7/11
USPC ........................................................ 704/231
See application file for complete search history.

(56) References Cited

U.S. PATENT DOCUMENTS

| | | | | |
|---|---|---|---|---|
| 8,843,369 | B1* | 9/2014 | Sharifi | G10L 25/03 704/235 |
| 9,098,467 | B1* | 8/2015 | Blanksteen | G10L 15/22 |
| 10,049,665 | B2 | 8/2018 | Lee et al. | |
| 10,133,821 | B2 | 11/2018 | Tandiono et al. | |
| 10,521,189 | B1* | 12/2019 | Ryabov | G06F 40/117 |
| 10,685,652 | B1* | 6/2020 | Cherukuri | G10L 25/51 |
| 10,826,862 | B1* | 11/2020 | Suprasadachandran Pillai | H04L 51/224 |
| 11,361,763 | B1* | 6/2022 | Maas | G10L 15/18 |
| 2003/0144844 | A1* | 7/2003 | Colmenarez | G10L 15/24 704/E15.041 |
| 2004/0021765 | A1* | 2/2004 | Kubala | H04N 7/15 348/14.08 |
| 2010/0057450 | A1* | 3/2010 | Koll | G10L 15/32 704/270.1 |
| 2010/0204989 | A1* | 8/2010 | Boes | G10L 15/30 704/235 |
| 2011/0015928 | A1* | 1/2011 | Odell | G10L 15/30 704/275 |
| 2011/0054899 | A1* | 3/2011 | Phillips | G10L 15/30 704/235 |
| 2011/0060587 | A1* | 3/2011 | Phillips | G10L 15/30 704/235 |
| 2011/0135152 | A1* | 6/2011 | Kashiwagi | G06V 40/167 382/116 |
| 2011/0246190 | A1 | 10/2011 | Suzuki et al. | |
| 2012/0035935 | A1 | 2/2012 | Park et al. | |
| 2012/0053710 | A1* | 3/2012 | Lindahl | G11B 20/10 704/500 |
| 2012/0078397 | A1* | 3/2012 | Lee | G10L 25/78 700/94 |
| 2012/0179471 | A1* | 7/2012 | Newman | G10L 15/30 704/270.1 |
| 2012/0192196 | A1* | 7/2012 | Yasuda | G06Q 10/10 718/103 |
| 2012/0259623 | A1* | 10/2012 | Dragosh | H04M 3/4936 704/201 |
| 2012/0296644 | A1* | 11/2012 | Koll | G10L 15/32 704/E15.001 |
| 2013/0021459 | A1* | 1/2013 | Vasilieff | G10L 25/78 348/E7.085 |
| 2013/0080177 | A1* | 3/2013 | Chen | G10L 15/183 704/275 |
| 2013/0085753 | A1* | 4/2013 | Bringert | G10L 15/32 704/E15.039 |
| 2013/0185072 | A1* | 7/2013 | Huang | G10L 25/72 704/246 |
| 2014/0028826 | A1 | 1/2014 | Lee et al. | |
| 2014/0058732 | A1* | 2/2014 | Labsky | G10L 15/30 704/E15.005 |
| 2014/0088967 | A1* | 3/2014 | Kawamura | G10L 15/30 704/251 |
| 2014/0163977 | A1* | 6/2014 | Hoffmeister | G10L 15/32 704/232 |
| 2014/0249817 | A1* | 9/2014 | Hart | G06F 3/167 704/254 |
| 2015/0007036 | A1* | 1/2015 | Jin | H04L 67/10 715/733 |
| 2015/0019074 | A1* | 1/2015 | Winter | G10L 15/22 704/231 |
| 2015/0032238 | A1* | 1/2015 | Ondo | G10L 15/28 700/94 |
| 2015/0053781 | A1* | 2/2015 | Nelson | G05D 23/1902 236/1 C |
| 2015/0100313 | A1* | 4/2015 | Sharma | G10L 15/28 704/235 |
| 2015/0120288 | A1* | 4/2015 | Thomson | G10L 15/22 704/231 |
| 2015/0348548 | A1* | 12/2015 | Piernot | G10L 15/26 704/235 |
| 2016/0035350 | A1* | 2/2016 | Jung | G06F 3/167 704/275 |
| 2017/0169817 | A1* | 6/2017 | VanBlon | G10L 15/02 |
| 2017/0206900 | A1* | 7/2017 | Lee | H04R 1/406 |
| 2018/0190279 | A1* | 7/2018 | Anderson | G10L 15/22 |
| 2019/0049942 | A1* | 2/2019 | Dusane | G10L 15/22 |
| 2020/0043492 | A1 | 2/2020 | Kim et al. | |
| 2020/0160857 | A1* | 5/2020 | Alameh | G10L 15/22 |
| 2020/0184972 | A1* | 6/2020 | Kolavennu | G10L 15/08 |
| 2020/0286475 | A1* | 9/2020 | Ji | G06N 5/022 |
| 2020/0379730 | A1* | 12/2020 | Graham | H04M 1/72442 |
| 2021/0005203 | A1* | 1/2021 | Inui | G10L 15/04 |
| 2021/0027790 | A1 | 1/2021 | Choi et al. | |
| 2021/0035554 | A1 | 2/2021 | Iwase et al. | |
| 2021/0110814 | A1* | 4/2021 | Iwase | G10L 15/04 |
| 2021/0125600 | A1* | 4/2021 | Xu | G06F 40/205 |
| 2021/0200597 | A1* | 7/2021 | Mochizuki | G10L 15/22 |
| 2021/0327436 | A1* | 10/2021 | Zheng | G06F 3/167 |
| 2022/0044680 | A1* | 2/2022 | Wang | G10L 17/00 |
| 2022/0093097 | A1* | 3/2022 | Jin | G10L 15/22 |
| 2022/0157293 | A1* | 5/2022 | Fujita | G10L 15/26 |
| 2022/0343900 | A1* | 10/2022 | Choi | G10L 15/08 |
| 2022/0350330 | A1* | 11/2022 | Wang | G06F 1/1626 |

FOREIGN PATENT DOCUMENTS

| | | |
|---|---|---|
| JP | 2011-227236 A | 11/2011 |
| JP | 2019-074498 A | 5/2019 |
| JP | 2019-132997 A | 8/2019 |
| KR | 10-2014-0014812 A | 2/2014 |
| KR | 10-1688164 B1 | 12/2016 |
| KR | 10-2019-0059046 A | 5/2019 |
| KR | 10-2019-0065199 A | 6/2019 |
| KR | 10-2019-0074344 A | 6/2019 |
| KR | 10-2019-0105182 A | 9/2019 |
| WO | WO2019/138651 A1 | 1/2021 |

OTHER PUBLICATIONS

International Search Report with Written Opinion dated Jan. 18, 2021; International Appln No. PCT/KR2020/013718.

* cited by examiner

ELECTRONIC APPARATUS AND CONTROLLING METHOD THEREOF

CROSS-REFERENCE TO RELATED APPLICATION(S)

This application is based on and claims priority under 35 U.S.C. § 119(a) of a Korean patent application number 10-2019-0125169, filed on Oct. 10, 2019, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus capable of recognizing a user voice and providing a response to the user voice and a controlling method thereof.

2. Description of the Related Art

Recently, an artificial intelligence system has been used in various fields. The artificial intelligence system is a system where unlike the existing rule-based smart system, a machine learns, makes a decision, and becomes smart by itself. As the artificial intelligence system is used more, the recognition rate is improved and a user's preference can be understood more accurately. Thus, the existing rule-based smart system is gradually being replaced by a deep learning-based artificial intelligence system.

In particular, in these days, an interactive system (or an artificial intelligence assistant system) capable of providing a response to a user voice or controlling an electronic apparatus based on a user voice using an artificial intelligence system has been developed.

However, the interactive system of the prior art has a limitation in that speech recognition and natural language understanding regarding an additional user voice is possible only after a response to a user voice is provided. Specifically, when observing a conversation between people, there are many cases where additional queries or conversations on different topics are made during the conversation. However, when a user voice for a query is input from a user during a conversation between an interactive system and a person, making an additional query or having a conversation on different topics is not possible until a response to the user voice is provided. In other words, there is a limitation in that the user must wait until the providing of a response to the interactive system is completed in order to make an additional query.

Accordingly, in a conversation between an interactive system and a person, a method for providing a response more actively and instantly according to a user's needs is required.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an electronic apparatus that, based on an audio signal including a user's additional voice being input while a response to a user voice is provided, determines whether there is an additional voice of the user by analyzing an image captured by (through) a camera, stops providing the response to the user voice based on a result of the determination, and provides a response to the user's additional voice and a controlling method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a microphone, a camera, a memory configured to store at least one command, and at least one processor configured to be connected to the microphone, the camera, and the memory and control the electronic apparatus.

In accordance with another aspect of the disclosure, the at least one processor is further configured to, by executing the at least one command, based on a first user voice being input from a user, obtain and provide a response to the first user voice, based on an audio signal including a voice being input while the response to the first user voice is provided, analyze an image captured by the camera and determine whether there is a second user voice uttered by the user in the audio signal, and based on determining that there is the second user voice uttered by the user in the audio signal, stop providing the response to the first user voice and obtain and provide a response to the second user voice.

In accordance with another aspect of the disclosure, a controlling method of an electronic apparatus is provided. The controlling method includes, based on a first user voice being input from a user, obtaining and providing a response to the first user voice, based on an audio signal including a voice being input while the response to the first user voice is provided, analyzing an image captured by a camera and determining whether there is a second user voice uttered by the user in the audio signal, and based on determining that there is the second user voice uttered by the user in the audio signal, stopping providing the response to the first user voice and obtaining and providing a response to the second user voice.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
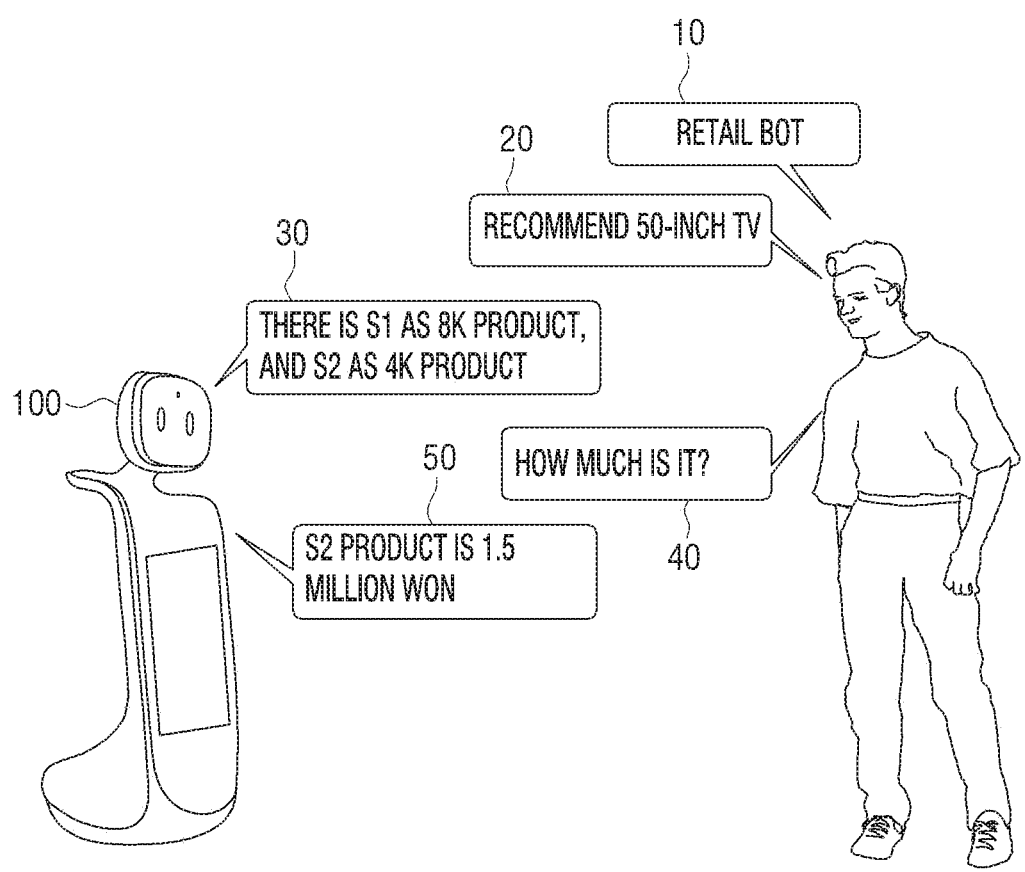
FIG. 1 is a view provided to explain an example of providing a response to a user's additional voice based on a user image captured while a response is provided to the user according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the terms "have," "may have," "comprise," or "may comprise" designate the presence of the corresponding features (e.g., numbers, functions, operations or components such as parts, etc.), but do not exclude the presence of additional features.

In the description, expressions such as "A or B," "at least one of A and/or B," or "one or more of A and/or B" may include all possible combinations of the items listed together. For example, "A or B," "at least one of A and/or B," or "one or more of A and/or B" may refer to the cases of (1) including at least one A, (2) including at least one B, or (3) including at least one A and at least one B.

Expressions "first," "second," or the like, used in the disclosure, may indicate various components regardless of a sequence and/or importance of the components, will be used only in order to distinguish one component from the other components, and do not limit the corresponding components. For example, the first user device and the second user device may indicate different user devices regardless of order or importance. For example, the first component may be referred to as the second component and similarly, the second component may be referred to as the first component without departing from the scope of rights described in the disclosure.

In the disclosure, terms such as 'a module', 'a unit', 'a part', etc. are used to refer to a component that performs at least one function or operation, and may be implemented by hardware or software or a combination of hardware and software. In addition, a plurality of 'modules', 'units', 'parts', etc. may be integrated into at least one module or chip to be implemented as at least one processor except for the case where each of them should be realized using a specific hardware.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). However, when it is mentioned that any component (for example, a first component) is "directly coupled with/to" or "directly connected to" to another component (for example, a second component), it is to be understood that the other component (for example, a third component) is not present between any component and another component.

An expression "configured (or set) to" used in the disclosure may be replaced by an expression "suitable for," "having the capacity to," "designed to," "adapted to," "made to," or "capable of" depending on a situation. A term "configured (or set) to" may not necessarily mean only "specifically designed to" in hardware. Instead, an expression "an apparatus configured to" may mean that the apparatus is "capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

The terms used in this document are only used to describe specific embodiments, and may not be intended to limit the scope of other embodiments. Singular expressions may include plural expressions unless the context clearly indicates otherwise. Terms used herein, including technical or scientific terms, may have the same meaning as commonly understood by a person skilled in the art described in this document. Among the terms used in this document, terms defined in a general dictionary may be interpreted as having the same or similar meaning in the context of the related art, and should not be interpreted to have ideally or excessively formal meanings unless explicitly defined in this document. In some cases, even terms defined in this document cannot be interpreted to exclude embodiments of this document.

Hereinafter, the disclosure will be described in greater detail with reference to the accompanying drawings. However, in describing the disclosure, when it is determined that detailed descriptions of related known functions or configurations may unnecessarily obscure the subject matter of the disclosure, detailed descriptions thereof are abbreviated or omitted. Throughout the accompanying drawings, similar components will be denoted by similar reference numerals.

Hereinafter, the disclosure will be described in greater detail with reference to the accompanying drawings.

FIG. 1 is a view provided to explain an example of providing a response to a user's additional voice based on a user image captured while a response is provided to the user according to an embodiment of the disclosure.

Referring to FIG. 1, an electronic apparatus according to an embodiment may be a robot, but this is only an example. The electronic apparatus according to an embodiment may be a portable device such as a smart phone, a tablet personal computer (PC), or a home appliance such as a television (TV), a refrigerator, washing machine, etc. In this case, an electronic apparatus 100 may include a camera for photographing a user and a microphone to receive a user voice, but this is only an example. The electronic apparatus 100 may be connected to an external camera and microphone.

If is detected that a user gets close, the electronic apparatus 100 may output a guide message guiding a wake-up word for controlling the electronic apparatus 100. For example, the electronic apparatus 100 may output a guide message, "Please call me 'Retail Bot' and talk to me". In this case, the guide message is output in an audible form through a speaker, but this is only an example. The guide message may be output in a visual form through a display, or may be output in a visual form and an audible form simultaneously.

If a user utters a wake-up word 10, the electronic apparatus 100 may recognize the wake-up word 10 uttered by the user. For example, as illustrated in FIG. 1, if the user utters "Retail Bot," the electronic apparatus 100 may recognize the wake-up word 10 uttered by the user.

When the wake-up word 10 is recognized, the electronic apparatus 100 may register a user included in an image captured by (through) a camera. That is, the electronic apparatus 100 may extract an area where a person is included in the captured image in response to the wake-up word 10. Subsequently, the electronic apparatus 100 may register the user included in the extracted area. Alternatively, the electronic apparatus 100 may register a user who is currently using the electronic apparatus 100 from among pre-registered users based on an iris or a face included in the image.

In addition, when the wake-up word 10 is recognized, the electronic apparatus 100 may execute a plurality of neural network models included in an interactive system. For example, the electronic apparatus 100 may execute a speech recognition model, a natural language understanding model, a natural language generation model, or a Text to Speech (TTS) model included in an interactive system. Although the electronic apparatus 100 may execute a plurality of neural network models simultaneously, this is only an example. The electronic apparatus 100 may execute the plurality of neural network models sequentially.

The electronic apparatus 100 may receive an audio signal including a user voice 20 (or a first user voice) uttered by a user through a microphone. For example, the user voice 20 may be "Recommend a 50-inch TV".

The electronic apparatus 100 may obtain and provide a response 30 regarding the user voice 20. Specifically, the electronic apparatus 100 may perform pre-processing (e.g., noise removal, etc.) regarding the user voice 20. The electronic apparatus 100 may perform speech recognition regarding the pre-processed user voice 20 to obtain text data corresponding to the user voice 20. Subsequently, the electronic apparatus 100 may perform natural language understanding based on the text data corresponding to the user voice 20 to obtain user intent and slot information regarding the user voice 20. The electronic apparatus 100 may obtain response information regarding the user voice from an external server or a memory based on the user intent and the slot information. The electronic apparatus 100 may perform natural language generation based on the response information to obtain the response 30 to the user voice 20. For example, the electronic apparatus 100 may obtain the response 30 of "There is S1 as an 8K product, S2 as a 4K product, and S3 as an entry-level product".

The electronic apparatus 100 may output the obtained response 30 regarding the user voice 20. For example, as illustrated in FIG. 1, the electronic apparatus 100 may output the response 30 regarding the user voice 20 through a speaker (not shown).

If an audio signal is input while the response 30 regarding the user voice 20 is provided, the electronic apparatus 100 may store the audio signal in a buffer regardless of whether there is the user's additional voice in the audio signal.

In particular, if an audio signal including a voice is input while the response 30 regarding the user voice 20 is provided, the electronic apparatus 100 may determine whether there is a user's additional voice 40 (or a second user voice) uttered by the user in the audio signal by analyzing the image captured through a camera. Specifically, the electronic apparatus 100 may extract an area including the registered user in the image captured through a camera while the response 30 regarding the user voice 20 is provided, and determine whether there is the user's additional voice 40 uttered by the registered user in the audio signal by analyzing the area including the registered user. In particular, the electronic apparatus 100 may extract a lip area of the registered user in the image captured through a camera, and determine whether there is the user's additional voice 40 uttered by the registered user in the audio signal by analyzing an input area of the registered user. For example, the electronic apparatus 100 may analyze the user image and determine that there is the user's additional voice 40 of "How much is it?" as illustrated in FIG. 1.

If it is determined that there is the user's additional voice 40 uttered by the user in the audio signal, the electronic apparatus 100 may stop providing the response 30 regarding the user voice 20, and obtain and provide a response 50 regarding the user's additional voice 40. Specifically, if it is determined that there is the second user voice uttered by the user in the audio signal, the electronic apparatus 100 may obtain a response to the second user voice based on an audio signal stored in a buffer. Specifically, the electronic apparatus 100 may perform pre-processing regarding the audio signal that is input at the time when the user's additional voice 40 is input from among audio signals stored in the buffer. Subsequently, the electronic apparatus 100 may perform speech recognition regarding the pre-processed audio signal to obtain a text corresponding to the user's additional voice 40. The electronic apparatus 100 may perform natural language understanding based on the obtained text to obtain user intent and slot information regarding the user's additional voice 40, and may obtain response information regarding the user's additional voice 40 based on the user intent and the slot information. The electronic apparatus 100 may perform natural language generation regarding the response information to obtain the response 50 regarding the user's additional voice 40. For example, the electronic apparatus 100 may obtain the response 50 of "The S2 product is 1.5 million won" as the response 50 regarding the user's additional voice 40. The electronic apparatus 100 may provide the obtained response 50 regarding the user's additional voice 40.

In the above embodiment, it is described that a response to the user's additional voice 40 is provided directly, but this is only an example. If it is determined that there is the user's additional voice 40 uttered by the user in the audio signal, the electronic apparatus 100 may display a UI inquiring whether to stop providing the response 30 regarding the user voice 20.

In addition, the electronic apparatus 100 may obtain the response 50 regarding the user's additional voice 40 in association with an external server. For example, the electronic apparatus 100 may obtain category information regarding the user's additional voice 40. In this case, the category information regarding the user's additional voice 40 may be information regarding a domain of the user's additional voice. The electronic apparatus 100 may compare the category information regarding the user voice 20 with the category information regarding the user's additional voice 40. If the category information regarding the user voice 20 and the category information regarding the user's additional voice 40 are related or relevant to each other, the electronic apparatus 100 may perform natural language understanding regarding the user's additional voice 40 through a first natural language understanding model present in the electronic apparatus 100. However, if the category information regarding the user voice 20 and the category information regarding the user's additional voice 40 are unrelated or irrelevant to each other, the electronic apparatus 100 may perform natural language understanding by transmitting information regarding the user's additional voice 40 to a server where a second natural language understanding model is stored.

In another embodiment, the electronic apparatus 100 may identify a sentence type of the user's additional voice 40, and perform natural language understanding regarding the user's additional voice 40 based on the sentence type. For example, if the sentence type of the user's additional voice 40 is a plan sentence, the electronic apparatus may perform natural language understanding regarding the user's additional voice 40 through the first natural language understanding model present in the electronic apparatus 100. However, if the user's additional voice 40 is an interrogative sentence, the electronic apparatus 100 may perform natural language understanding by sending information regarding the user's additional voice 40 to a server where the second natural language understanding model is stored.

In addition, the electronic apparatus 100 may obtain response information regarding a user's additional voice based on pre-stored conversation history information. For example, as illustrated in FIG. 1, if there is a pronoun such as "it" in the user's additional voice 40, the electronic apparatus 100 may determine that "it" means "S2" based on pre-stored conversation history information (e.g., information regarding the user voice 20 and the response 30 to the user voice 20), and obtain information on the price of "S2" as a response to the user's additional voice 40.

If it is determined that the second user voice uttered by the user is not in the audio signal, the electronic apparatus 100 may ignore the audio signal stored in the buffer and provide a response to the first user voice continuously.

According to the above-described embodiment, as an electronic apparatus determines whether there is a user's additional query by analyzing a user image while a response to a user voice is provided, it is possible to provide more instant and active response according to circumstances.

Figure 2:
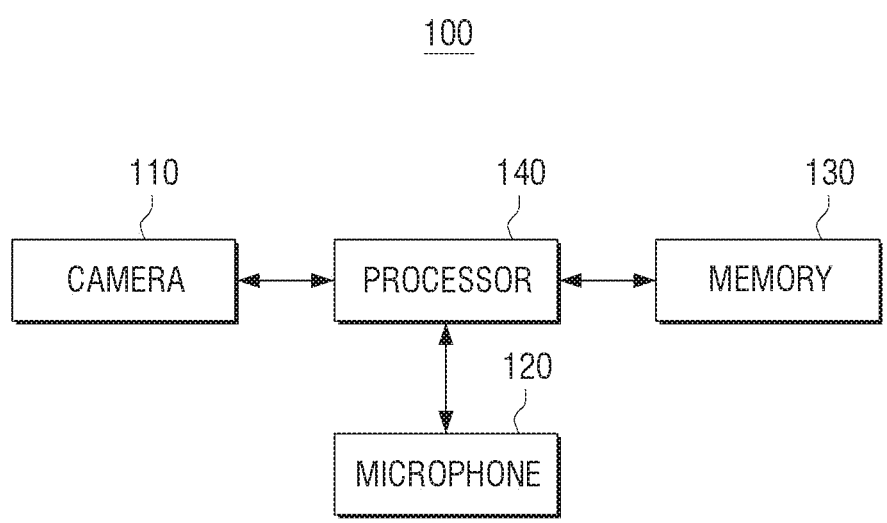
FIG. 2 is a block diagram illustrating a configuration of an electronic apparatus for providing a response to a user voice according to an embodiment of the disclosure.

FIG. 2 is a block diagram illustrating a configuration of an electronic apparatus for providing a response to a user voice according to an embodiment of the disclosure.

Referring to FIG. 2, the electronic apparatus 100 may include a camera 110, a microphone 120, a memory 130, and at least one processor 140. The configuration of FIG. 2 is only an example, and other components may be added or some components may be deleted or combined according to an embodiment of the electronic apparatus 100.

The camera 110 may photograph a user through an image sensor and obtain a user image. In this case, the user image may include not only the user, but also objects (e.g., furniture, home appliances, exhibits, etc.) included in an environment where the user is located. The camera 110 may be provided in plural locations in a main body of the electronic apparatus 100, but this is only an example. The camera 110 may be located outside the electronic apparatus 100 and electrically connected to the electronic apparatus 100.

The microphone 120 may receive an audio signal including a user voice. In this case, the microphone 120 may receive an audio signal including a wake-up word (or a trigger word) or an audio signal including a user voice for inquiring specific information or controlling the device. In this case, the microphone 120 may be provided in plural locations in the main body of the electronic apparatus 100, but this is only an example. The microphone 120 may be located outside the electronic apparatus 100 and electrically connected to the electronic apparatus 100.

Figure 3:
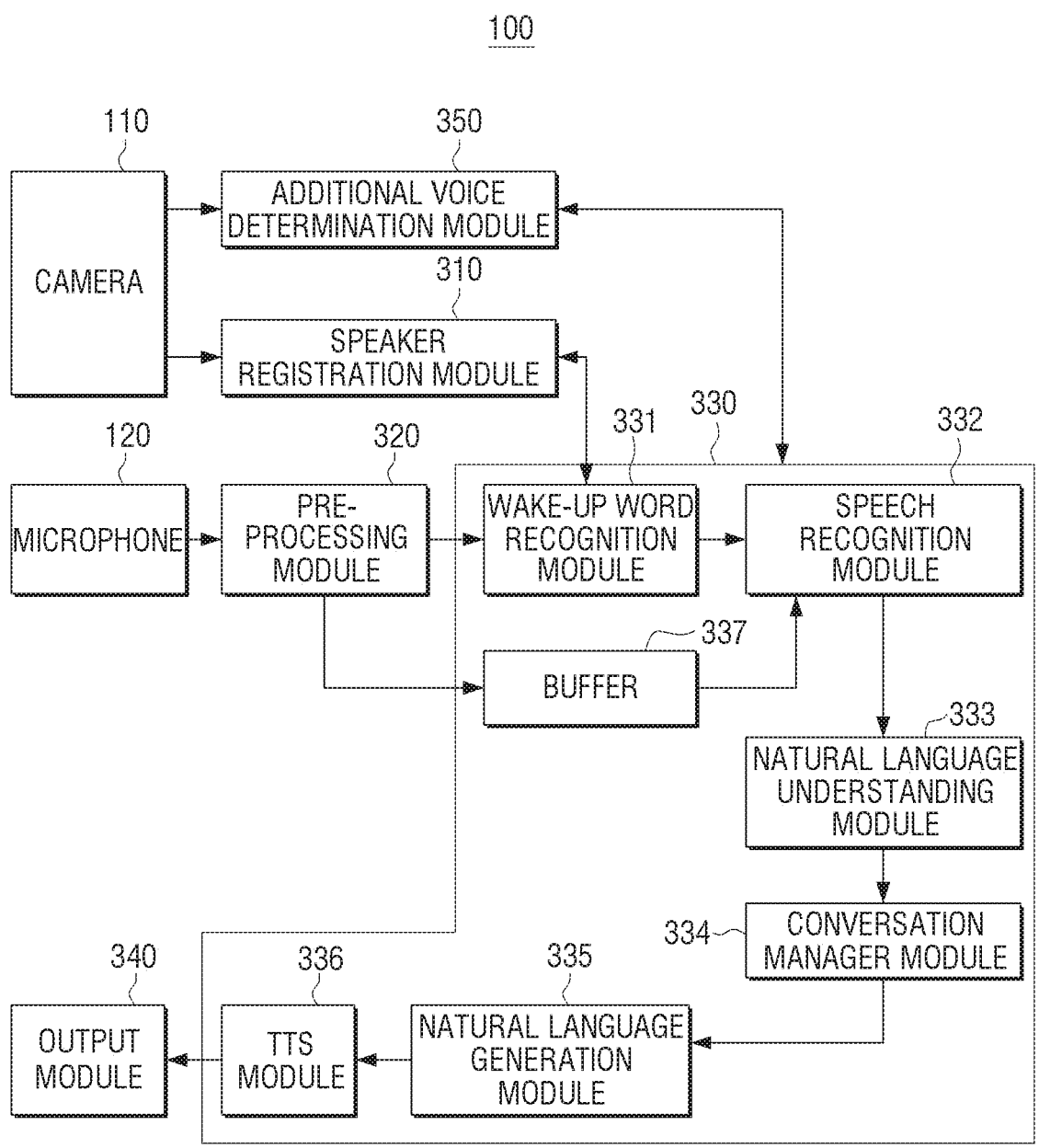
FIG. 3 is another block diagram including a configuration of an electronic apparatus for providing a response to a user voice according to an embodiment of the disclosure.

The memory 130 may store commands or data related to at least one other component of the electronic apparatus 100. In particular, the memory 130 may include a non-volatile memory and a volatile memory and for example, may be implemented as a flash memory, a hard disk drive (HDD), a solid state drive (SSD), etc. The memory 130 may be accessed by the processor 140, and reading/recording/correction/deletion, etc. of data by the processor 140 may be performed. In addition, the memory 130 may store an artificial intelligence agent for operating an interactive system. Specifically, the electronic apparatus 100 may generate a natural language as a response to a user's utterance or use an artificial intelligence agent to obtain a control command. In this case, the artificial intelligence agent is a dedicated program for providing an artificial intelligence (AI)-based service (e.g., a speech recognition service, an assistant service, a translation service, a search service, etc.). In particular, the artificial intelligence agent may be executed by the existing general-purpose processor (e.g., a CPU) or a separate processor dedicated for AI (e.g., a graphics processing unit (GPU), a network processing unit (NPU), etc.). In addition, the memory 130 may include a plurality of components (or modules) constituting an interactive system as illustrated in FIG. 3, which will be described in greater detail with reference to FIG. 3.

In addition, the memory 130 may include a buffer capable of temporarily storing an audio signal that is input while the electronic apparatus 100 provides a response to a user voice. That is, if an audio signal is input while a response to the first user voice is provided, the buffer may store the input audio signal regardless of whether there is the second user voice uttered by the user in the audio signal. In this case, the buffer may store a timestamp of the audio signal along with the audio signal.

The processor 140 may be electrically connected to the memory 130 and control the overall operations of the electronic apparatus 100. In particular, the processor 140, by executing at least one command stored in the memory 130, when the first user voice is input from the user through the microphone 120, may obtain and provide a response to the first user voice. Subsequently, if an audio signal including a voice is input while the response to the first user voice is provided, the processor 140 may analyze an image captured through the camera 110 and determine whether there is the second user voice uttered by the user in the audio signal. If it is determined that there is the second user voice uttered by the user in the audio signal, the electronic apparatus 100 may stop providing the response to the first user voice and obtain and provide a response to the second user voice.

Specifically, if a third user voice including a wake-up word is input from the user, the processor 140 may recognize the wake-up word and register a user included in an image captured through the camera 110. The processor 140 may extract an area including the registered user in the image captured through the camera 110 while a response to the first user voice is provided, and determine whether there is the second user voice uttered by the registered user in the audio signal by analyzing the area including the registered user. In particular, the processor 140 may extract the user's lip area from among areas including the user, and determine whether there is the second user voice uttered by the registered user in the audio signal by determining whether the user's lip area moves.

If it is determined that there is the second user voice uttered by the user in the audio signal, the processor 140 may obtain and provide a response to the second user voice based on the audio signal stored in the buffer. However, if it is determined that the second user voice uttered by the user is not in the audio signal, the processor 140 may ignore the audio signal stored in the buffer.

The processor 140 may perform natural language understanding regarding a user's additional voice in association with an external server based on the category information, the sentence type, etc. of the user voice. For example, the processor 140 may identify category information of the first user voice and store the information in the memory 130. Subsequently, if it is determined that there is the second user voice uttered by the user in the audio signal, the processor 140 may identify category information of the second user voice. The processor 140 may perform natural language understanding regarding the second user voice based on the category information of the first user voice and the category information of the second voice. That is, if the category information of the first user voice and the category information of the second user voice are related or relevant to each other, the processor 140 may perform natural language understanding regarding the second user voice through the first natural language understanding model present in the electronic apparatus 100, and if the category information of the first user voice and the category information of the second user voice are unrelated or irrelevant to each other, the processor 140 may perform natural language understanding by transmitting information regarding the second user voice to a server where the second natural language understanding model is stored. In another embodiment, if the sentence type of the second user voice is an interrogative sentence, the processor 140 may perform natural language understanding by transmitting information regarding the second user voice to a server where the second natural language understanding model is stored.

In addition, the processor 140 may obtain and provide a response to the second user voice based on conversation history information. Specifically, if the first user voice is input, the processor 140 may store the first user voice and information related to a response to the first user voice in the memory 130 as conversation history information with the user. Subsequently, if it is determined that there is the second user voice uttered by the user in the audio signal, the processor 140 may obtain and provide a response to the second user voice based on the second user voice and the conversation history information.

If it is determined that there is the second user voice uttered by the user in the audio signal, the processor 140 may stop providing a response to the first user voice immediately, but this is only an example. The processor 140 may provide a UI inquiring whether to stop providing a response to the first user voice.

FIG. 3 is another block diagram including a configuration of an electronic apparatus for providing a response to a user voice according to an embodiment of the disclosure.

Referring to FIG. 3, components are illustrated for performing a conversation with a virtual artificial intelligence agent through a natural language or for controlling the electronic apparatus 100. The electronic apparatus 100 may include a speaker registration module 310, a pre-processing module 320, an interactive system 330, an output module 340, and an additional voice determination module 350. In this case, the interactive system 330 may include a wake-up word recognition module 331, a speech recognition module 332, a natural language understanding module 333 (or first natural language understanding module), a conversation manager module 334 (or first conversation manager module), a natural language generation module 335 (or first natural language generation module), a TTS module 336 (or first TTS module), and a buffer 337. According to an embodiment, the modules included in the interactive system 330 may be stored in the memory 130 of the electronic apparatus 100, but this is only an example. The modules may be implemented using hardware, software or in a combination of hardware and software. In addition, at least one module included in the interactive system 330 may be included at least one external server.

When a wake-up word is recognized by the wake-up recognition module 331, the speaker registration module 310 may extract a user in an image captured by the camera 110 and register the user as a speaker. Specifically, when a wake-up word is recognized, the speaker registration module 310 may detect an area where a user is in the image captured by the camera 110 and register the user present in the detected area as a speaker. In this case, the speaker registration module 310 may register the user by inputting the image captured when the wake-up word is recognized, to an object recognition model that is a neural network model trained to detect a speaker.

According to another embodiment, the speaker registration module 310 may identify one of pre-registered users based on an image captured by the camera 110 and register the user as a speaker. Specifically, the speaker registration module 310 may detect the face, iris, etc. of a user from the captured image. Subsequently, the speaker registration module 310 may identify one of pre-registered users based on the detected face, iris, etc. of the user, and register the identified user as a speaker.

The pre-processing module 320 may perform pre-processing with respect to an audio signal received through the microphone 120. Specifically, the pre-processing module 320 may receive an audio signal in an analog form including a user voice through a microphone and convert the analog signal into a digital signal. Subsequently, the pre-processing module 320 may extract a user voice section by calculating an energy of the converted digital signal. Specifically, the pre-processing module 320 determines whether the energy of the digital signal is equal to or greater than a predetermined value. If the energy of the digital signal is equal to or greater than the predetermined value, the pre-processing module 320 determines that it is a voice section and removes a noise regarding the input digital signal or reinforces the user voice. If the energy of the digital signal is less than the predetermined value, the pre-processing module 320 may await another input without performing any signal processing regarding the input digital signal. Accordingly, the entire audio processing process is not activated by a sound other than a user voice, preventing unnecessary power consumption.

The wake-up word recognition module 331 may determine whether a wake-up word is included in a user voice through a wake-up model. In this case, the wake-up word (or a trigger word) refers to a command (e.g., retail bot, Bixby, Galaxy) that indicates the start of speech recognition by a user, and the electronic apparatus 100 may execute an interactive system. In this case, the wake-up word may be preset by a manufacturer, but this is only an example. The wake-up word may be changed by a user setting. In particular, the wake-up word recognition module 331 may output a signal to register a speaker with the speaker registration module 310 when a wake-up word is recognized.

The speech recognition module 332 may convert a user voice in the form of audio data received from the pre-processing module 320 into text data. In this case, the speech recognition module 332 may include an acoustic model and a language model. The acoustic model may include information regarding utterance, and the language model may include information regarding unit phoneme and a combination of unit phoneme information. The speech recognition module 332 may convert a user voice into text data using information regarding utterance and information regarding unit phoneme. Information regarding the acoustic model and the language model may be stored, for example, in an automatic speech recognition database (ASR DB).

The natural language understanding module 333 may perform a syntactic analysis or a semantic analysis based on text data regarding a user voice obtained through speech recognition to obtain a user's domain and intent regarding the user voice. In this case, the syntactic analysis may divide the user input into syntactic units (for example, words, phrases, morphemes, or the like) and obtain which grammatical elements the divided units have. The semantic analysis may be performed using semantic matching, rule matching, formula matching, or the like. In particular, the natural language understanding module 333 may obtain the category of the user voice, the intent of the user voice, and a slot (or entity, parameter, etc.) for performing the intent of the user voice.

The conversation manager module 334 may obtain response information regarding a user voice based on the user intent and slot obtained by the natural language understanding module 333. In this case, the conversation manager module 334 may provide a response to a user voice based on a knowledge database (DB). Here, the knowledge DB may be included in the electronic apparatus 100, but this is only an example. The knowledge DB may be included in an external server. In addition, the conversation manager module 334 may include a plurality of knowledge DBs based on the characteristics of each user and obtain response information regarding a user voice using a knowledge DB corresponding to user information from among the plurality of knowledge DBs. Further, the conversation manager module 334 may determine whether the user's intent identified by the natural language understanding module 333 is clear. For example, the conversation manager module 334 may determine whether the user's intent is clear based on whether there is sufficient information regarding the slot. The conversation manager module 334 may determine whether the slot identified by the natural language understanding module 333 is sufficient to perform a task. According to an embodiment, if the user's intent is not clear, the conversation manager module 334 may perform a feedback requesting necessary information from the user.

The natural language generation module 335 may change response information obtained through the conversation manager module 334 or designated information into a text form. The changed information in the text form may be in the form of a natural language utterance. The designated information may be, for example, information regarding an additional input, information guiding completion of an operation corresponding to a user input, or information guiding an additional input of a user (e.g., feedback information regarding a user input). The changed information in the text form may be displayed on a display of the electronic apparatus 100 or may be changed into a voice form by the TTS module 336.

The TTS module 336 may change text-type information to voice-type information. In this case, the TTS module 336 may include a plurality of TTS models for generating a response in various voices, and the TTS module 336 may obtain a response voice in the form of a voice using a TTS model corresponding to a user from among the plurality of TTS models. For example, if it is determined that the user is a child, the TTS module 336 may obtain a response voice using a TTS model corresponding to the child (e.g., a TTS model for generating a voice of an animation character that the child likes).

The buffer 337 may store an audio signal that is received while a response is output by the output module 340. In particular, the buffer 337 may store an audio signal regardless of whether there is an utterance of an additional voice from a user registered by the speaker registration module 310. In particular, the signal stored in the buffer may be an audio signal received from the microphone 120, but this is only an example. The signal stored in the buffer may be an audio signal where pre-processing is performed by the pre-processing module 320.

The output module 340 may output information in the form of voice data received from the TTS module 336. In this case, the output module 340 may output information in the form of voice data through a speaker or a voice output terminal. Alternatively, the output module 340 may output information in the form of text data obtained through the natural language generation module 335 through a display or an image output terminal.

The additional voice determination module 350 may determine whether there is an additional voice from a registered user (or a speaker) while a response is provided. Specifically, the additional voice determination module 350 may detect a lip area of a registered user in an image captured by a camera 110. In this case, the additional voice determination module 350 may obtain a plurality of feature points of the lip area. For example, the additional voice determination module 350 may extract a first feature point corresponding to a left edge of the lip, a second feature point corresponding to a right edge of the lip, a third feature point corresponding to a middle of the upper lip, and a fourth feature point corresponding to a middle of the lower lip. In addition, the additional voice determination module 350 may determine whether there is an additional voice from a registered user based on the movement of the obtained feature points. That is, if at least one of the plurality of feature points moves more than a threshold distance, the additional voice determination module 350 may determine that there is an additional voice from the registered user.

If it is determined that there is an additional voice from the registered user, the additional voice determination module 350 may output a signal for performing speech recognition regarding the additional voice of the registered user and information regarding the point of time when the additional voice exists, to the speech recognition module 332. In this case, the speech recognition module 332 may perform speech recognition based on an audio signal at a time when the additional voice is among audio signals stored in the buffer 337. In this case, the output module 340 may stop outputting a response to a voice that is previously input, and output a response to the additional voice.

Figure 4:
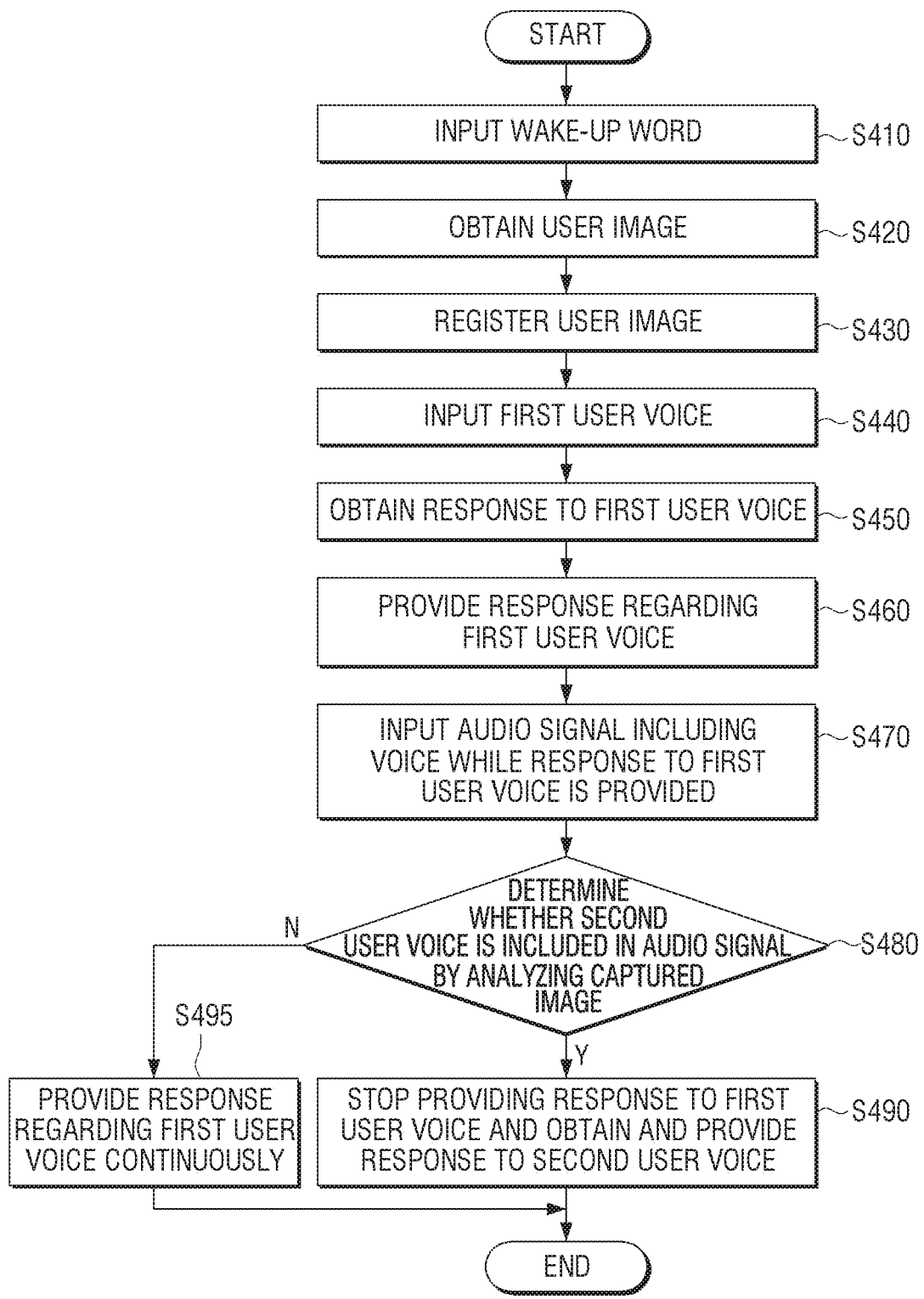
FIG. 4 is a flowchart provided to explain an example of providing a response to a user's additional voice that is input while a response to a user voice is provided according to an embodiment of the disclosure.

FIG. 4 is a flowchart provided to explain an example of providing a response to a user's additional voice that is input while a response to a user voice is provided according to an embodiment of the disclosure.

Referring to FIG. 4, the electronic apparatus 100 may receive a wake-up word at operation S410. Specifically, the electronic apparatus 100 may receive a wake-up word for initiating a conversation with the interactive system 330 of the electronic apparatus 100.

The electronic apparatus 100 may obtain a user image at operation S420. Specifically, when a wake-up word is input, the electronic apparatus 100 may obtain a user image from an area where the user is located from an image captured through a camera. In this case, the electronic apparatus 100 may obtain information regarding the user image by inputting the captured image to a neural network model that is trained to recognize a speaker.

The electronic apparatus 100 may register the user image at operation S430. Specifically, the electronic apparatus 100 may register the user image that is obtained when the wake-up word is uttered.

The electronic apparatus 100 may receive a first user voice at operation S440. In this case, the first user voice is a voice that is uttered by a registered user and may be a user voice for controlling the electronic apparatus 100 or a user voice for inquiring information.

The electronic apparatus 100 may obtain a response to the first user voice at operation S450. Specifically, the electronic apparatus 100 may obtain text data corresponding to the first user voice by performing speech recognition regarding the first user voice, obtain category information, user intent and slot information by performing natural language understanding based on the text data, obtain response information based on the user intent and the slot information, and obtain a response to the first user voice by performing natural language generation regarding the response information. In this case, the electronic apparatus 100 may store information regarding the first user voice as conversation history information. The conversation history information includes not only information regarding the first user voice but also information regarding a response to the first user voice.

The electronic apparatus 100 may provide a response to the first user voice at operation S460. Specifically, the electronic apparatus 100 may provide a response to the first user voice by inputting the response to the first user voice to a TTS model and processing the response in the form of voice data.

The electronic apparatus 100 may receive an audio signal including a voice while the first user voice is provided at operation S470. In this case, the electronic apparatus 100 may store the audio signal including a voice in a buffer.

The electronic apparatus 100 may determine whether the second user voice is included in an audio signal by analyzing a captured image at operation S480. That is, the electronic apparatus 100 may determine whether there is an additional utterance by a registered user based on the user's specific area (e.g., lip, etc.) in the captured image.

Figure 5:
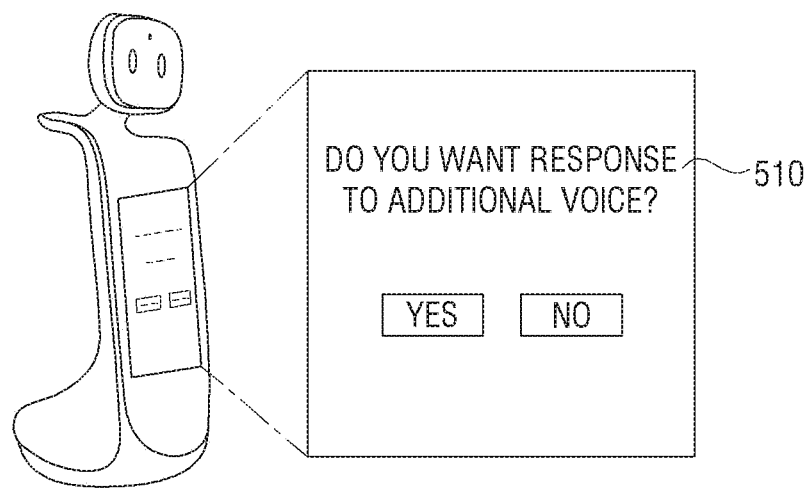
FIG. 5 is a view illustrating a user interface (UI) in which an electronic apparatus inquires whether to provide a response to a user's additional voice according to an embodiment of the disclosure.

If it is determined that the second user voice is included in the audio signal at operation S480-Y, the electronic apparatus 100 may stop providing a response to the first user voice and obtain and provide a response to the second user voice at operation S490. In this case, the electronic apparatus 100 may stop providing a response to the first user voice immediately, but this is only an example. The electronic apparatus 100 may display a UI inquiring whether to stop providing a response to the first user voice. For example, as illustrated in FIG. 5, a UI 510 including a guide phrase of "Do you want a response to the additional voice?" may be displayed. In addition, in order to provide a response to the second user voice as soon as possible, the electronic apparatus 100 may obtain a response to the second user voice stored in a buffer regardless of whether to stop providing a response to the first user voice. In this case, the method of obtaining a response to the second user voice is the same as that of operation S450 and thus, detailed description thereof will be omitted.

If it is determined that the second user voice is not included in the audio signal at operation S480-N, the electronic apparatus 100 may continue providing the response to the first user voice at operation S495.

In the above-described embodiment, when a user's additional voice is input while a response to a user voice is provided in the electronic apparatus, a response to the user's additional voice is provided, but this is only an example. The electronic apparatus and a server may interlock to provide a response to the user's additional voice FIG. 5 is a view illustrating a UI in which an electronic apparatus inquires whether to provide a response to a user's additional voice according to an embodiment of the disclosure.

Referring to FIGS. 4 and 5, if it is determined that the second user voice is included in the audio signal at operation S480-Y, the electronic apparatus 100 may display the UI 510 for inquiring whether to stop providing a response to the first user voice rather than immediately and/or automatically stopping the response to the first user voice. For example, the UI 510 including a guide phrase of "Do you want a response to the additional voice?" may be displayed.

Figure 6:
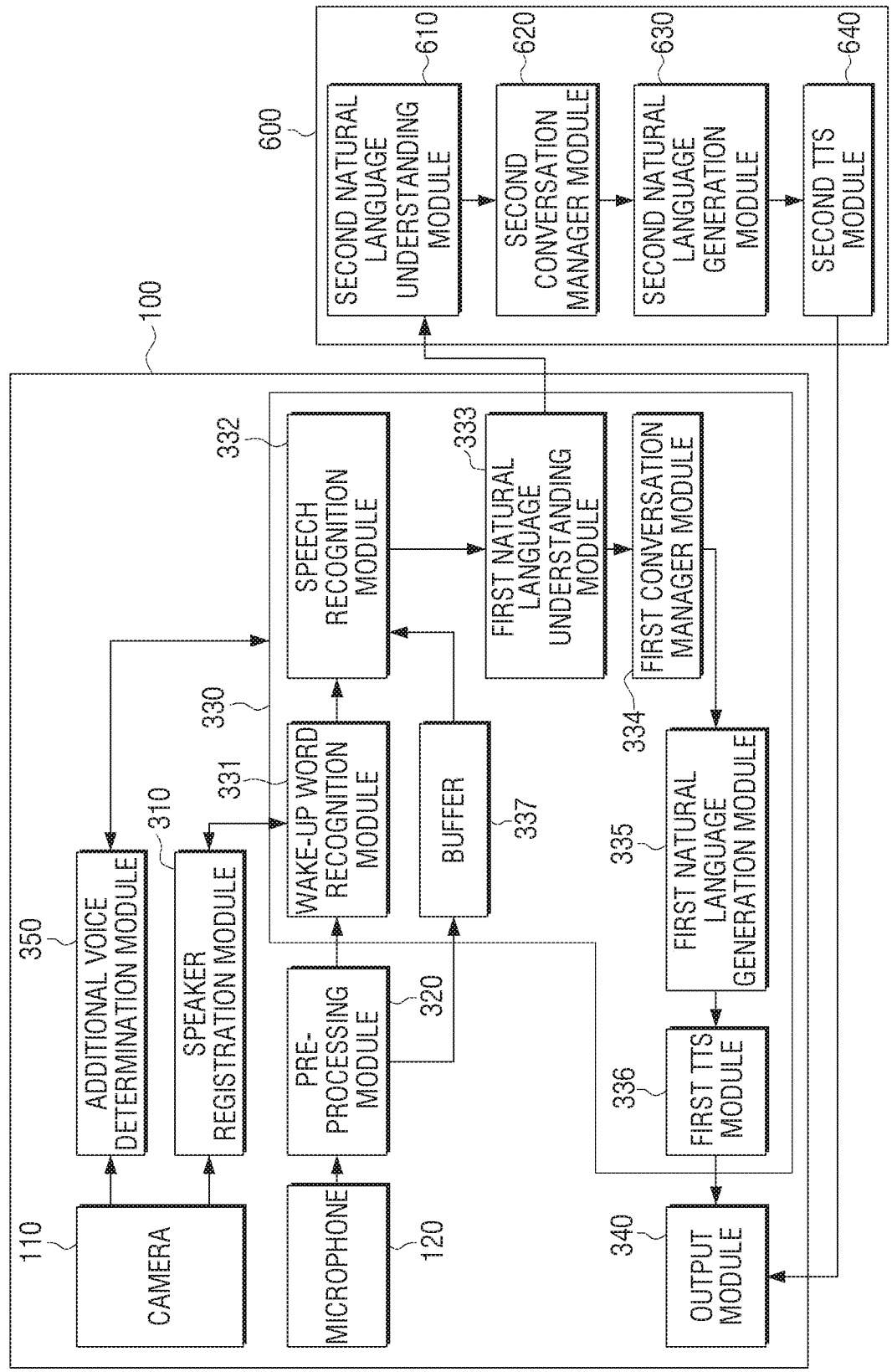
FIG. 6 is a block diagram of a system including a configuration of an electronic apparatus for providing a response to a user voice in association with a server according to an embodiment of the disclosure.

FIG. 6 is a block diagram of a system including a configuration of an electronic apparatus for providing a response to a user voice in association with a server according to an embodiment of the disclosure.

Referring to FIG. 6, the system may include the electronic apparatus 100 and a server 600. In this case, the electronic apparatus 100 may include a module as illustrated in FIG. 3. The configuration included in the electronic apparatus 100 as illustrated in FIG. 6 is the same as the configuration included in the electronic apparatus 100 as illustrated in FIG. 3 and thus, duplicate descriptions will be omitted. In addition, for the purpose of introducing the server 600, the natural language understanding module 333, the conversation manager module 334, the natural language generation module 335, and the TTS module as illustrated in FIG. 3, may now be referred to as the first natural language understanding module 333, the first conversation manager module 334, the first natural language generation module 335, and the first TTS module 336 included in the electronic apparatus 100 as illustrated in FIG. 6, and may be of the same configuration as the modules as illustrated in FIG. 3.

Referring to FIG. 6, the server 600 may include a second natural language understanding module 610, a second conversation manager module 620, a second natural language generation module 630, and a second TTS module 640. In this case, each of the second natural language understanding module 610, the second conversation manager module 620, the second natural language generation module 630, and the second TTS module 640 may perform the functions of the first natural language understanding module 333, the first conversation manager module 334, the first natural language generation module 335, and the first TTS module 336. However, the neural network model included in the second natural language understanding module 610 may be a neural network trained by more categories and languages in comparison with the neural network model included in the first natural language understanding module 333. That is, the neural network model included in the second natural language understanding module 610 may have more improved performance than the neural model included in the first natural language understanding module 333. In addition, the second conversation manager module 620 may obtain response information using a knowledge DB having more data than the first conversation manager module 334. Further, the neural network model for generating a natural language included in the second natural language generation module 630 may be a neural network model trained based on more languages and data in comparison with the neural network model for generating a natural language included in the first natural language generation module 335. The neural network model included in the second TTS module 640 may also be a neural network model trained based on more languages and data in comparison with the neural network model included in the first TTS module 336.

As described in operations S410 to S480 of FIG. 4, the electronic apparatus 100 may determine whether the second user voice of a registered user is included in the input audio signal while a response to the first user voice is provided.

If it is determined that the second user voice is included in the audio signal, the speech recognition module 332 may perform speech recognition based on the second user voice include in the audio signal stored in the buffer 337 to obtain text data corresponding to the second user voice.

Figure 9:
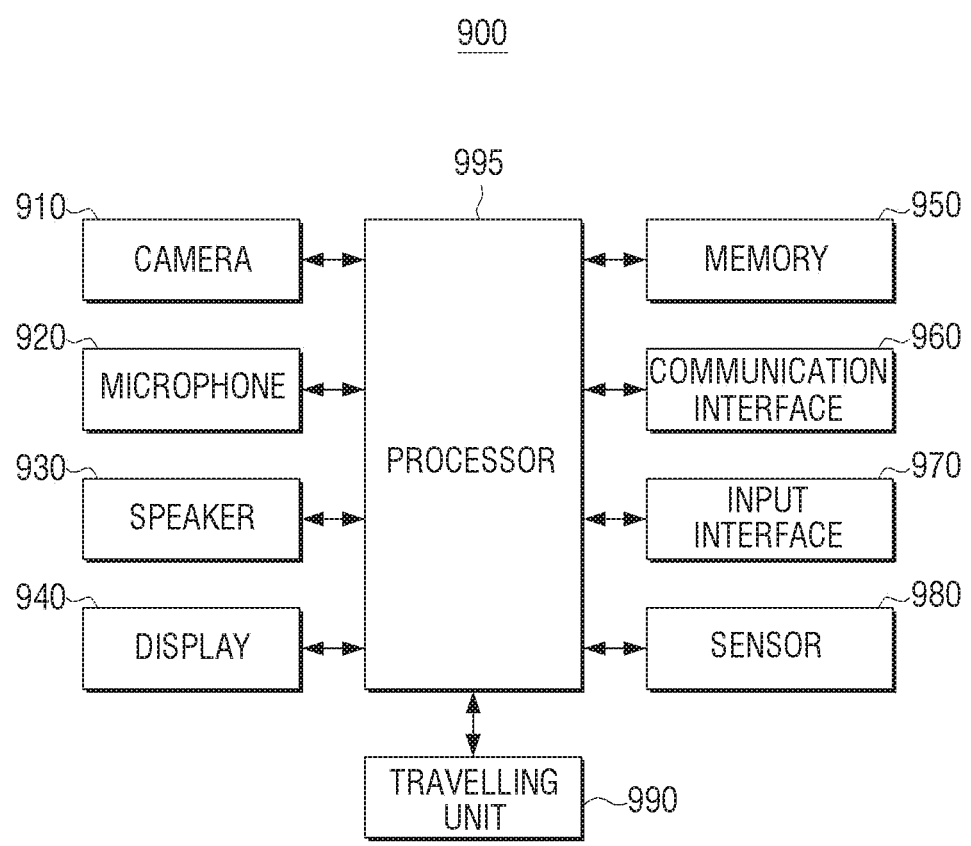
FIG. 9 is another block diagram illustrating a configuration of an electronic apparatus in detail according to an embodiment of the disclosure.

The first natural language understanding module 333 may determine the category information or sentence type of the second user voice based on the text data corresponding to the second user voice. According to an embodiment, the first natural language understanding module 333 may compare the category of the second user voice and the category of the first user voice. That is, the first natural language understanding module 333 may compare the category of the second user voice and the category of the first user voice to determine whether the user's additional voice is related or relevant to the previous user voice. If the category of the second user voice and the category of the first user voice are related or relevant to each other, the first natural language understanding module 333 may perform natural language understanding regarding the second user voice directly. However, if the category of the second user voice and the category of the first user voice are unrelated or irrelevant to each other, the first natural language understanding module 333 may transmit information regarding the second user voice to the server 600. The first natural language understanding module 333 may communicate with the server 600 using a communication interface as shown in FIG. 9, including features such as a transceiver.

According to another embodiment, the first natural language understanding module 333 may determine the sentence type of the second user voice. Specifically, the first natural language understanding module 333 may determine the sentence type of the text data corresponding to the second user voice. If the sentence type of the text data corresponding to the second user voice is an interrogative sentence, the first natural language understanding module 333 may transmit information regarding the second user voice to the server 600. That is, when the user's additional voice regarding search or inquiry is obtained, the electronic apparatus 100 may transmit information regarding the second user voice to the server 600 in order to obtain more accurate response.

According to another embodiment, the first natural language understanding module 333 may determine the priority of the second user voice. In this case, if it is determined that the priority of the second user voice is higher than a threshold value, the first natural language understanding module 333 may perform natural language understanding regarding the second user voice. However, if it is determined that the priority of the second user voice is lower than the threshold value, the first natural language understanding module 333 may transmit information regarding the second user voice to the server 600. In this case, the priority of the user voice may be determined according to whether an urgent response is required.

When information regarding the second user voice is received from the electronic apparatus 100, the second natural language understanding module 610 of the server 600 may perform natural language understanding regarding the second user voice based on the information regarding the second user voice. In this case, the information regarding the second user voice may include not only text data corresponding to the second user voice, but also conversation history information. The conversation history information may include the first user voice and information regarding the first user voice. That is, the second natural language understanding module 610 may perform natural language understanding not only with the second user voice, but also with the information regarding the first user voice. For example, if the second user voice includes pronouns such as 'that' and 'this', the second natural language understanding module 610 may determine a noun corresponding to 'that' based on the first user voice and a response to the first user voice included in the conversation history information.

The second conversation manager module 620 may obtain response information regarding the second user voice based on the user intent and slot information identified by the second natural language understanding module 610, and the second natural language generation module 630 may generate a natural language based on the response information and obtain a response in the form of a natural language regarding the second user voice. The second TTS module 640 may convert a response in the form of a natural language to voice data. The server 600 may transmit the converted response in the form of voice data to the electronic apparatus 100. The output module 340 of the electronic apparatus 100 may output the obtained response to the second user voice.

Figure 7:
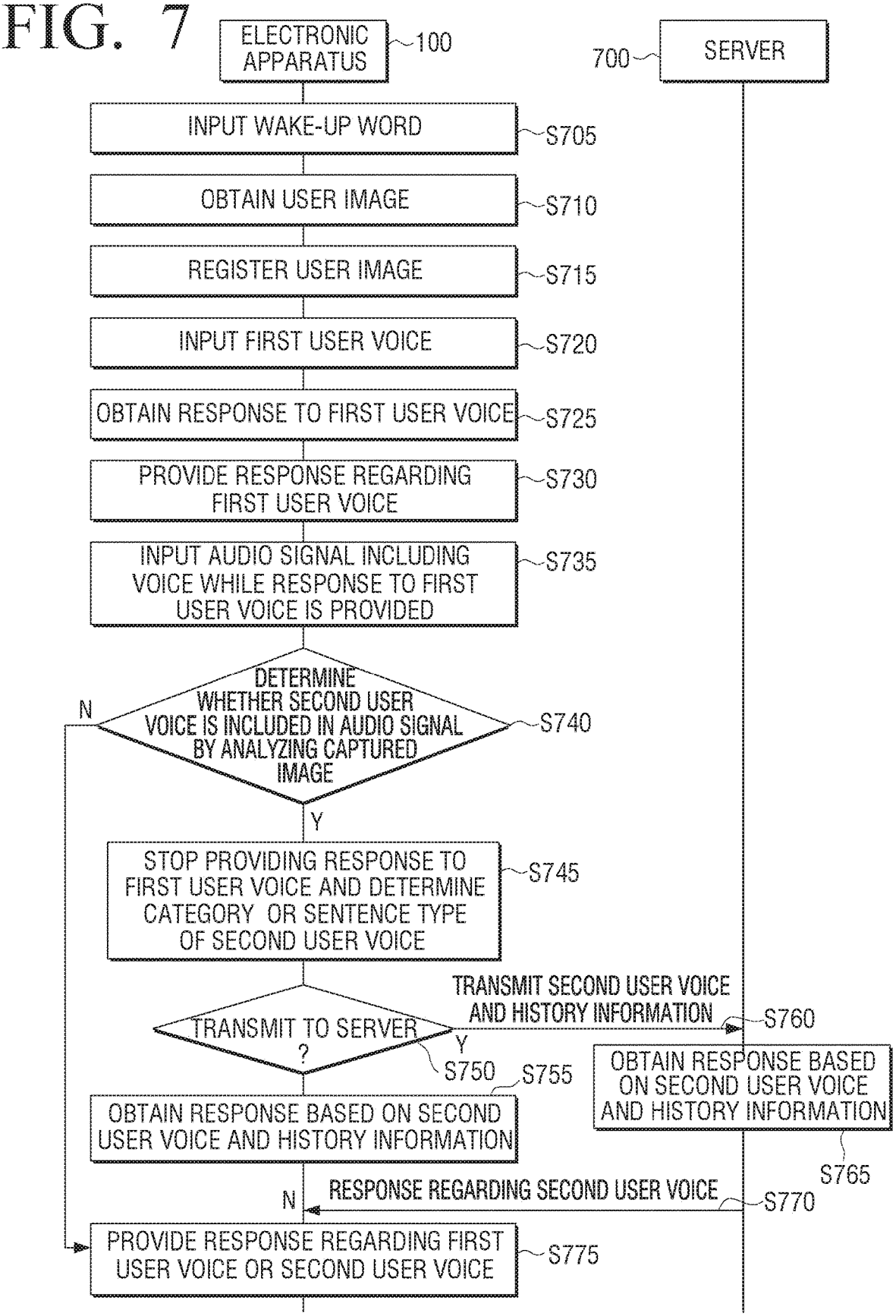
FIG. 7 is a sequence view provided to explain an example of providing a response to a user's additional voice that is input while a response to a user voice is provided, in association with an external server according to an embodiment of the disclosure.

FIG. 7 is a sequence view provided to explain an example of providing a response to a user's additional voice that is input while a response to a user voice is provided, in association with an external server according to an embodiment of the disclosure.

Operations S705 to S740 illustrated in FIG. 7 correspond to operations S410 to S480 illustrated in FIG. 4 and thus, duplicate descriptions thereof will be omitted.

Referring to FIG. 7, if it is determined that the second user voice is included in the audio signal at operation S740-Y, the electronic apparatus 100 may stop providing a response to the first user voice, and determine the category or sentence type of the second user voice at operation S745. In this case, the electronic apparatus 100 may obtain information regarding the category of the second user voice through a domain classifier. Alternatively, the electronic apparatus 100 may determine the sentence type by analyzing the text corresponding to the second user voice (e.g., the text at the end of the sentence, etc.).

The electronic apparatus 100 may determine whether to transmit information regarding the second user voice to a server 700 based on the determined category or sentence type of the second user voice at operation S750. Specifically, if the category of the second user voice is related or relevant to the category of the previous first user voice, the electronic apparatus 100 may determine that the information regarding the second user voice is not transmitted to the server 700. Further, if the sentence type of the second user voice is not an interrogative sentence, the electronic apparatus 100 may also determine that the information regarding the second user voice is not transmitted to the server 700. However, if the category of the second user voice is unrelated or irrelevant to the category of the first user voice, the electronic apparatus 100 may transmit the information regarding the second user voice to the server 700 at operation S760. Further, if the sentence type of the second user voice is an interrogative sentence, the electronic apparatus 100 may also transmit the information regarding the second user voice to the server 700 at operation S760.

If it is determined that the second user voice is not transmitted to the server 700 at operation S750-N, the electronic apparatus 100 may obtain a response based on the second user voice and history information at operation S755. In this case, the electronic apparatus 100 may obtain a response regarding the second user voice using a module (e.g., the first natural language understanding module 333, the first conversation manager module 334, the first natural language generation module 335, and the first TTS module 336, etc.) of an interactive system present in the electronic apparatus 100. The electronic apparatus 100 may provide the obtained response regarding the second user voice at operation S775.

If it is determined that the second user voice is transmitted to the server 700 at operation S750-Y, the electronic apparatus 100 may transmit the second user voice and history information to the server 700, and the server 700 may obtain a response based on the second user voice and the history information at operation S765. In this case, the server 700 may obtain a response regarding the second user voice using a module (a second natural language understanding module, a second conversation manager module, a second natural language generation module, and a second TTS module, etc.) of an interactive system present in the server 700. The server 700 may transmit the obtained response regarding the second user voice to the electronic apparatus 100 at operation S770, and the electronic apparatus 100 may provide the obtained response regarding the second user voice at operation S775.

If it is determined that the second user voice is not included in the audio signal at operation S740-N, the electronic apparatus 100 may provide a response regarding the first user voice continuously at operation S775.

Figure 8:
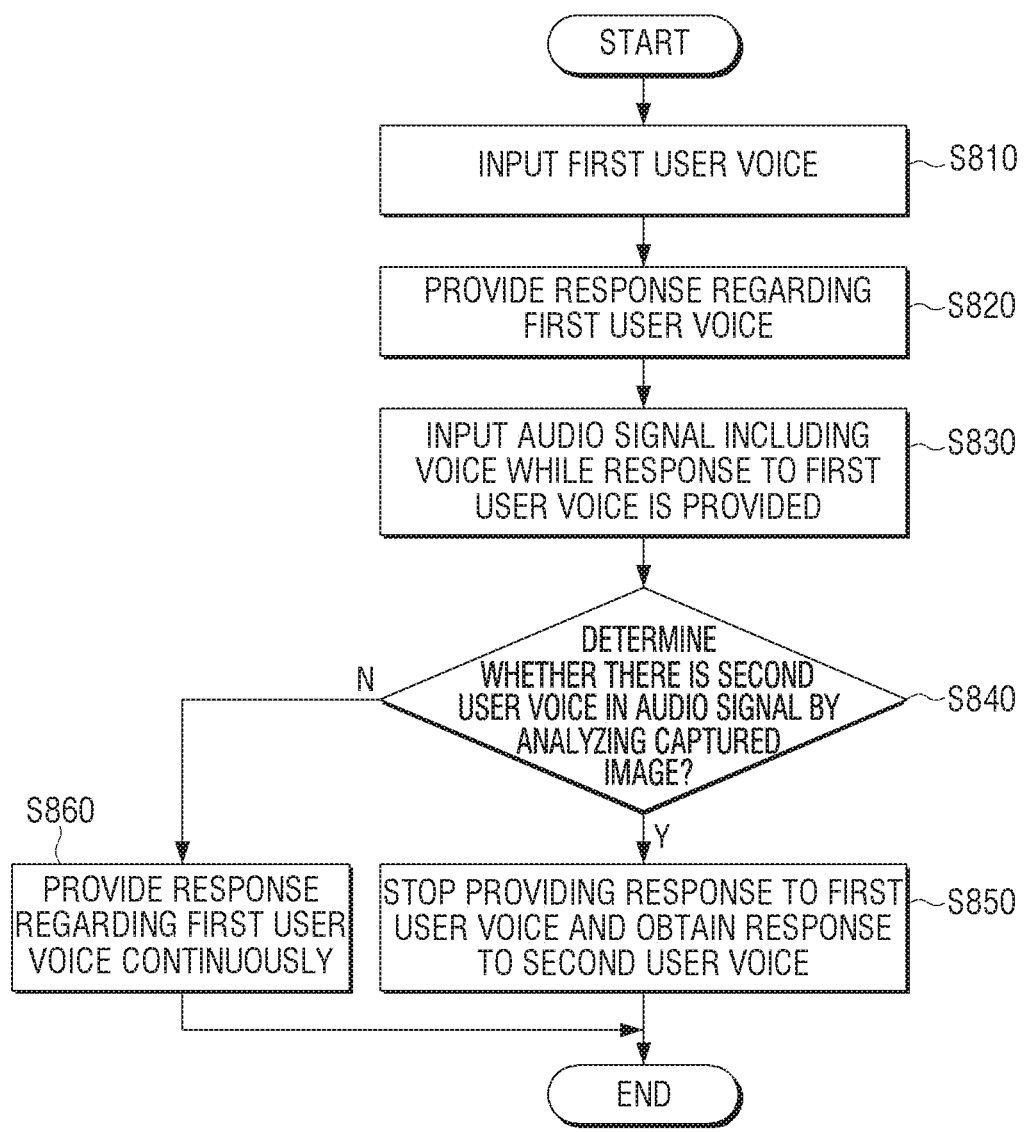
FIG. 8 is a flowchart provided to explain a controlling method of an electronic apparatus according to an embodiment of the disclosure.

FIG. 8 is a flowchart provided to explain a controlling method of an electronic apparatus according to an embodiment of the disclosure.

Referring to FIG. 8, the electronic apparatus 100 may receive the first user voice at operation S810.

Subsequently, the electronic apparatus 100 may provide a response to the first user voice at operation S820. Specifically, the electronic apparatus 100 may obtain a response to the first user voice using the interactive system illustrated in FIG. 3.

The electronic apparatus 100 may receive an audio signal including a voice while a response to the first user voice is provided at operation S830.

The electronic apparatus 100 may determine whether there is the second user voice in the audio signal by analyzing the captured image at operation S840. In this case, the second user voice may be a user voice that is additionally uttered by the user that uttered the first user voice.

If there is the second user voice in the audio signal at operation S840-Y, the electronic apparatus 100 may stop providing a response to the first user voice, and obtain a response to the second user voice at operation S850. That is, the electronic apparatus 100 may stop providing a response to the first user voice in order to provide a response to the second user voice that is additionally uttered, and obtain and provide a response to the second user voice.

If the second user voice is not in the audio signal at operation S840-N, the electronic apparatus 100 may provide a response to the first user voice continuously at operation S860.

FIG. 9 is another block diagram illustrating a configuration of an electronic apparatus in detail according to an embodiment of the disclosure.

Referring to FIG. 9, in particular, an electronic apparatus 900 according to an embodiment may be implemented as a movable robot, and may include a camera 910, a microphone 920, a speaker 930, a display 940, a memory 950, a communication interface 960, an input interface 970, a sensor 980, a travelling unit 990, and at least one processor 995. The camera 910, the microphone 920, the memory 950, and the at least one processor 995 illustrated in FIG. 9 correspond to the camera 110, the microphone 120, the memory 130, and the processor 140 described in FIG. 2 and thus, duplicate descriptions will be omitted. In addition, depending on the implementation of the electronic apparatus 900, some of the components of FIG. 9 may be removed, combined, or other components may be added.

The speaker 930 is a component for the electronic apparatus 900 to provide information audibly. The electronic apparatus 900 may include at least one speaker 930, and output a response to an input user voice, an inquiry about a user voice, alarm information, etc. as an audio signal through the speaker 930. A component for outputting an audio signal may be implemented as the speaker 930, but this is only an example. The component for outputting an audio signal may be implemented as an output terminal.

The display 940 is a component for the electronic apparatus 900 to provide information visually. The electronic apparatus 900 may include one or more displays, and display a response to an input user voice, an inquiry about a user voice, alarm information, etc. through each display 940. In this case, the display 940 may be implemented as a Liquid Crystal Display (LCD), a Plasma Display Panel (PDP), an Organic Light Emitting Diodes (OLED), a Transparent OLED (TOLED), a Micro LED, etc. In addition, the display 940 may be implemented in the form of a touch screen capable of detecting a user's touch manipulation or may be implemented as a flexible display that can be folded or bent.

In particular, the display 940 may not just provide a response to a user voice visually, but when an additional voice is input from a registered user, the display 940 may also provide a UI inquiring whether to stop providing a response to a user voice that is previously input.

The communication interface 960 is configured to perform communication with an external device using features such as a transceiver. The communication of the communication interface 960 with an external device may include communication through a third device (e.g., a repeater, a hub, an access point, a server, a gateway, etc.). Wireless communication may include cellular communication using, for example, at least one of long-term evolution (LTE), LTE Advance (LTE-A), code division multiple access (CDMA), wideband CDMA (WCDMA), universal mobile telecommunications system (UMTS), Wireless Broadband (WiBro), Global System for Mobile Communications (GSM), etc. According to an embodiment, the wireless communication may include, for example, at least one of wireless fidelity (WiFi), Bluetooth, Bluetooth low energy (BLE), Zigbee, near field communication, Magnetic Secure Transmission, Radio Frequency (RF), body area network (BAN), etc. According to an embodiment, the wired network may include, for example, at least one of a universal serial bus (USB), a high definition multimedia interface (HDMI), a recommended standard 232 RS-232, a power line communication, a plain old telephone service (POTS), etc. The network where the wireless communication or the wired communication is performed may include a telecommunication network, for example, a computer network (e.g., local area network (LAN) or wide area network (WAN)), the internet, a telephone network, etc.

In particular, the communication interface 960 may perform communication with an external server and provide an interactive system service. Specifically, the communication interface 960 may transmit the second user voice and history information to a server in order to obtain a response to the second user voice and receive a response regarding the second user voice from the server.

The input interface 970 may be configured to receive a user input for controlling the electronic apparatus 900. For example, the input interface 970 may be implemented as a touch panel, a button, a dial, etc. for receiving a user touch for controlling the electronic apparatus 900, but this is only an example. The input interface 970 may be implemented as an input device such as a keyboard, a mouse, etc.

The sensor 980 may be configured to sense information regarding a surrounding state of the electronic apparatus 900. In particular, the sensor 980 may include a proximity sensor for sensing the approach of a user or an object, a gyro sensor for obtaining movement information, an acceleration sensor, etc., and may include a sensor for obtaining biometric information of a user and a sensor for obtaining information (e.g., temperature, humidity, etc.) regarding the space where the electronic apparatus 900 is located.

The travelling unit 990 may be configured to move the electronic apparatus 900. In particular, the travelling unit 990 may include an actuator for travel of the electronic apparatus 900 across a surface from one location to another. In addition, an actuator for driving a motion of other physical components (e.g., arm, face, etc.) of the electronic apparatus 900 in addition to the travelling unit 990 may also be included. For example, the electronic apparatus 900 may control the actuator to transfer or move in a direction of the user sensed through the sensor 980.

The above-described various embodiments may be implemented by software including instructions that are stored in machine-readable storage media (e.g., a computer). The machine is an apparatus that invokes the stored instructions from the storage media and is operable according to the invoked instructions, and may include the electronic apparatus (e.g., the electronic apparatus 100) according to the disclosed embodiments. When the instructions are executed by a processor, the processor may be configured to perform functions corresponding to the instructions, either directly or using other components under the control of the processor. The instructions may include codes generated or executed by a compiler or an interpreter. The machine-readable storage media may be provided in the form of non-transitory storage media. Here, the term 'non-transitory' means that the storage medium does not include a signal and is tangible but does not distinguish whether data is stored semi-permanently or temporarily in the storage medium.

According to an embodiment, the method according to diverse embodiments may be provided as being included in a computer program product. The computer program product may be traded as a product between a seller and a purchaser. The computer program product may be distributed in the form of a machine-readable storage media (e.g., a compact disc read only memory (CD-ROM)), or online through an application store (e.g., PlayStore™). In the case of online distribution, at least a portion of the computer program product may be at least temporarily stored in a storage medium such as a memory of a server of a manufacturer, a server of an application store, or a relay server, or may be temporarily generated.

Each of the components (e.g., modules or programs) according to the diverse embodiments may include a single entity or a plurality of entities, and some sub-components of the components described above may be omitted, or other sub-components may be further included in the diverse embodiments. Alternatively, or additionally, some components (e.g., modules or programs) may be integrated into one entity to perform the same or similar functions performed by the respective components prior to the integration. The operations performed by the module, the program, or other component, in accordance with the diverse embodiments may be executed in a sequential, parallel, iterative, or heuristic manner, or at least some operations may be executed in a different order or omitted, or other operations may be added.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic apparatus comprising:
   a microphone;
   a camera;
   a memory configured to store at least one command; and
   at least one processor configured to be connected to the microphone, the camera, and the memory and control the electronic apparatus,
   wherein the at least one processor is further configured, by executing the at least one command, to:
   receive a first voice input from a first user through the microphone, using a first natural language understanding model at the electronic apparatus to identify a first category information of the first voice input and provide a response to the first voice input, receive a second voice input through the microphone while the response to the first voice input is being provided, analyze an image captured by the camera and determine whether the second voice input is uttered by the first user based on the captured image, in response to determining that the second voice input is uttered by the first user, stop the providing the response to the first voice input and using the first natural language understanding model to identify second category information in the second voice input, determine whether the first category in the first voice input is being related to the second category in the second voice input, in response to the first category information in the first voice input is being related to the second category information in the second voice input, use the first natural language understanding model to perform natural language understanding on the second voice input, and in response to the first category information in the first voice input is being unrelated to the second category information in the second voice input, control a communication interface to transmit the second voice input to a server and using a second natural language understanding model at the server to perform natural language understanding on the second voice input.

2. The electronic apparatus of claim 1, wherein the at least one processor is further configured to:

based on a third voice input including a wake-up word being input by the first user, recognize the wake-up word and register the first user included in an image captured by the camera;

extract an area including the registered user in the image captured by the camera while the response to the first voice input is being provided; and determine whether the second voice input uttered by the registered user is in an audio signal by analyzing the extracted area including the registered user.

3. The electronic apparatus of claim 2, wherein the at least one processor is further configured to:

extract a lip area of the registered user in the image captured by the camera; and determine whether the second voice input uttered by the registered user is in the audio signal by analyzing whether there is a movement of the extracted lip area of the registered user.

4. The electronic apparatus of claim 1, wherein the at least one processor is further configured to, based on an audio signal being input while the response to the first voice input is being provided, store the audio signal in a buffer without regard to whether the second voice input uttered by the first user is in the audio signal.

5. The electronic apparatus of claim 4, wherein the at least one processor is further configured to:

based on determining that the second voice input uttered by the first user is in the audio signal, obtain and provide the response to the second voice input based on the audio signal stored in the buffer; and based on determining that the second voice input uttered by the first user is not in the audio signal, ignore the audio signal stored in the buffer.

6. The electronic apparatus of claim 1, wherein the at least one processor is further configured to:

based on determining that the second voice input uttered by the first user is in an audio signal, identify a sentence type of the second voice input; and perform natural language understanding regarding the second voice input, based on the identified sentence type.

7. The electronic apparatus of claim 6, wherein the at least one processor is further configured to, based on the identified sentence type being interrogative, control to transmit information regarding the second voice input to a server providing the second natural language understanding model.

8. The electronic apparatus of claim 1, wherein the at least one processor is further configured to:

based on the first voice input being input, store the first voice input and information regarding the response to the first voice input in the memory as conversation history information of the first user; and based on determining that the second voice input uttered by the first user is in an audio signal, obtain and provide the response to the second voice input based on the second voice input and the conversation history information.

9. The electronic apparatus of claim 1, wherein the at least one processor is further configured to:

determine a priority of the second voice input; and based on a determination that the priority of the second voice input is higher than a threshold value, control to transmit information regarding the second voice input to a server providing the second natural language understanding model.

10. A controlling method of an electronic apparatus, the method comprising:

receiving a first voice input from a first user through a microphone, using a first natural language understanding model at the electronic apparatus to identify a first category information of the first voice input and provide a response to the first voice input;

receiving a second voice input through the microphone while the response to the first voice input is being provided, analyze an image captured by a camera and determine whether the second voice input is uttered by the first user based on the captured image;

in response to determining that the second voice input is uttered by the first user, stopping the providing the response to the first voice input and using the first natural language understanding model to identify second category information in the second voice input;

determining whether the first category in the first voice input is being related to the second category in the second voice input;

in response to the first category information in the first voice input is being related to the second category information in the second voice input, using the first natural language understanding model to perform natural language understanding on the second voice input; and in response to the first category information in the first voice input is being unrelated to the second category information in the second voice input, transmitting the second voice input to a server and using a second natural language understanding model at the server to perform natural language understanding on the second voice input.

11. The method of claim 10, further comprising:
based on a third voice input including a wake-up word being input by the first user, recognizing the wake-up word and registering the first user included in an image captured by the camera,
wherein the determining that the second voice input uttered by the first user is in an audio signal comprises:
extracting an area including the registered user in the image captured by the camera while the response to the first voice input is being provided; and
determining whether the second voice input uttered by the registered user is in the audio signal by analyzing the extracted area including the registered user.

12. The method of claim 11, wherein the determining that the second voice input uttered by the first user is in the audio signal further comprises:
extracting a lip area of the registered user in the image captured by the camera; and
determining whether the second voice input uttered by the registered user is in the audio signal by analyzing whether there is a movement of the extracted lip area of the registered user.

13. The method of claim 10, further comprising:
based on an audio signal being input while the response to the first voice input is being provided, storing the audio signal in a buffer without regard to whether the second voice input uttered by the first user is in the audio signal.

14. The method of claim 13, wherein the providing of the response to the second voice input comprises:
based on determining that the second voice input uttered by the first user is in the audio signal, obtaining a response to the second voice input based on the audio signal stored in the buffer, and
based on determining that the second voice input uttered by the first user is not in the audio signal, ignoring the audio signal stored in the buffer.

15. The method of claim 10, wherein the providing of the response to the second voice input comprises:
based on determining that the second voice input uttered by the first user is in an audio signal, identifying a sentence type of the second voice input; and
performing natural language understanding regarding the second voice input based on the identified sentence type.

16. The method of claim 10, further comprising:
based on the first voice input being input, storing the first voice input and information regarding the response to the first voice input in a memory as conversation history information of the first user,
based on determining that the second voice input uttered by the first user is in an audio signal, obtaining and providing the response to the second voice input based on the second voice input and the conversation history information.

* * * * *